June 30, 1953  C. F. JOHNSON  2,643,573
MASONRY ANCHOR BOLT
Filed Dec. 13, 1950

INVENTOR.
Chester F. Johnson
BY Victor J. Evans & Co.
ATTORNEYS

UNITED STATES PATENT OFFICE 2,643,573

MASONRY ANCHOR BOLT

Chester F. Johnson, Los Angeles, Calif.

Application December 13, 1950, Serial No. 200,520

1 Claim. (Cl. 85—1)

This invention relates to anchor bolts for securing plates, machinery and equipment to concrete floors, walls, and the like and also for retaining concrete, steel or wood joists in position on concrete posts and walls, and in particular a bolt having threaded ends with a split spring washer retained in contracted position on one end of the bolt by a nut and with the bolt formed to be inserted into a preformed hole having a counterbore therein.

The purpose of this invention is to provide a positive anchor bolt for holding elements to masonry walls, floors, and the like.

Anchor bolts have been provided of various types and in various designs but where parts are spread by the bolts in the holes the bolt is held by friction and where positive locking means is provided it is difficult to insert the elements in the opening and also difficult to spread or actuate the elements after they are inserted. With this thought in mind this invention contemplates an anchor bolt having a split spring washer clamped on a stud on one end, with the opposite end threaded to receive a locking nut and also having flat wrench receiving surfaces thereon, and in which the spring washer expands as it reaches a counterbore in an opening in concrete or the like into which the bolt is inserted.

The object of this invention is, therefore, to provide positive locking means for securing an anchor bolt in an opening having a counterbore therein.

Another object of the invention is to provide an anchor bolt in which a plurality of openings may be provided with locking elements so that parts may be held in position against a wall and bolts readily inserted therein for mounting the parts upon the wall.

A further object of the invention is to provide an anchor bolt having locking means on the inner end formed to expand into a counterbore of an opening in which the bolt is inserted, which is of a simple and economical construction.

With these and other objects and advantages in view the invention embodies a bolt having a threaded outer end with a stud having flat sides extended therefrom and having a stud with a threaded end extended from the opposite end, and a spring washer secured by a nut on the said stud having a threaded end.

Other features and advantages of the invention will appear from the following description taken in connection with the drawing wherein.

Figure 1:
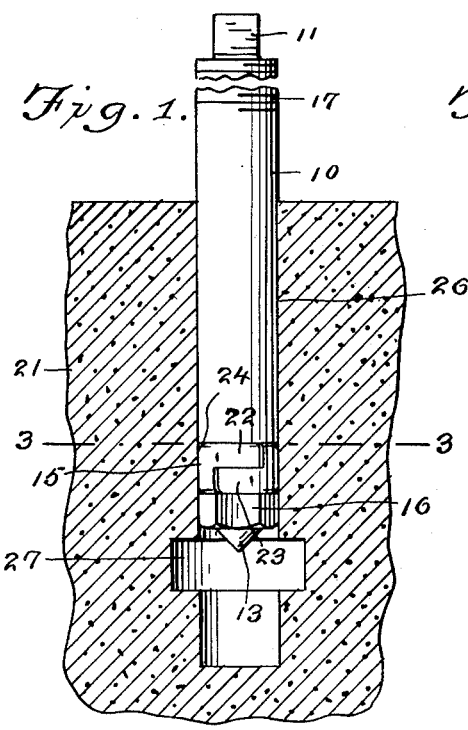
Figure 1 is a section through a portion of concrete illustrating the improved anchor bolt showing the bolt in elevation and partly inserted in an opening in the concrete.

Referring now to the drawings wherein like reference characters denote corresponding parts the improved anchor bolt of this invention includes a cylindrical body 10 having a stud 11 on the upper end which is shaped to receive a wrench, a stud or shank 12 on the lower end having a conical shape end 13 and provided with threads 14, a spring washer 15, and a nut 16.

The body 10 may be of any suitable size and the length thereof may be determined by the load that it is required to take.

Figure 2:
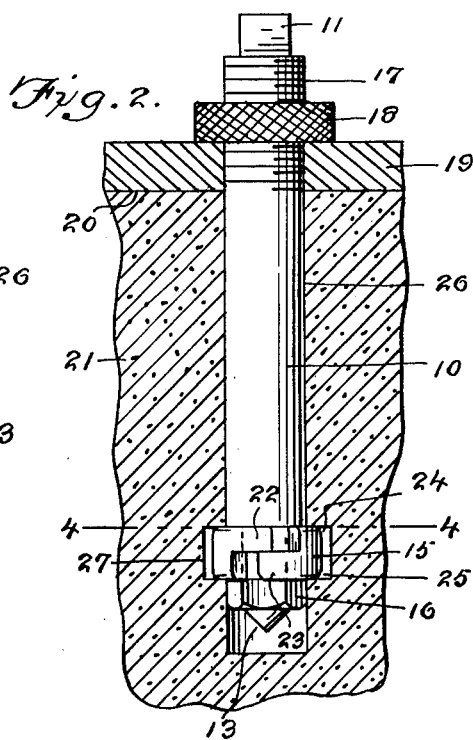
Figure 2 is a similar section also showing the bolt in elevation showing the bolt anchored in the concrete.
Figure 3:
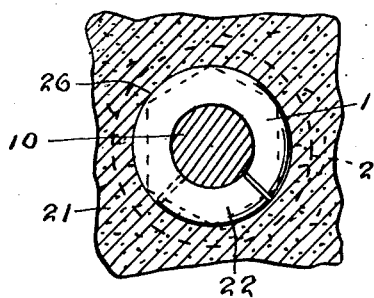
Figure 3 is a section on an enlarged scale taken on line 3—3 of Fig. 1 showing the spring washer in the contracted position.
Figure 4:
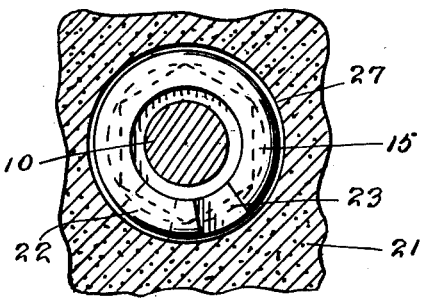
Figure 4 is a similar section taken on line 4—4 of Fig. 2 showing the spring washer expanded.
Figure 5:
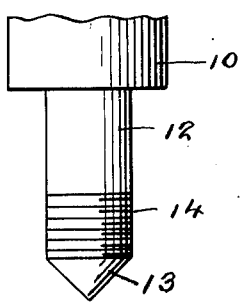
Figure 5 is a detail illustrating the stud having a threaded end extended from the inner end of the bolt and with the upper part of the bolt broken away.

In the design shown the upper end of the body 10 is provided with threads 17 upon which a nut 18 is threaded and, with the parts in the position, as shown in Fig. 2, the nut or collar 18 secures the plate or other member 19 against the outer surface 20 of concrete or other masonry as indicated by the numeral 21.

The spring washer 15 is provided with overlapping ends 22 and 23, as illustrated in Fig. 2 and, also as shown in Fig. 2 the peripheral edges 24 and 25 are rounded to facilitate inserting the washer in a hole 26.

With the parts arranged as shown and described the spring washer 15 is contracted on the stud 12 and held in this position by the nut 16 as the parts are inserted in the opening 26, as illustrated in Fig. 1, and when the anchor bolt reaches the final position in which the spring washer 15 is in registry with a counterbore 27 the spring washer expands to the position shown in Fig. 2 and the bolt is positively locked in the opening.

With the nut 16 threaded on the lower end of the stud 12 the stud may be unscrewed so that it may be removed as desired.

It will also be understood that in mounting a shelf or other member on a concrete wall or floor, openings may be provided at the desired points and the nuts 16 and spring washers 15 may be inserted in the openings so that as the shelf or other parts are placed in position upon the concrete it is only necessary to insert the anchor bolts and screw the studs 12 into the nuts 16.

With the parts arranged in this manner the anchor bolts may readily be inserted in masonry and may also be removed therefrom, as desired.

It will be understood that modifications may be made in the design and arrangement of the parts without departing from the spirit of the invention.

What is claimed is:

In a masonry anchor bolt, a cylindrical body having a threaded portion, a stud formed within the periphery of the body portion and extending from an end of said body and having wrench engaging faces thereon, a knurled collar threadedly engaging said cylindrical body, a reduced diameter cylindrical shank extending from the other end of said body and having a threaded free end portion, said shank terminating in a conical shaped end, a spring washer circumposed on said shank and provided with overlapping ends having their peripheral edges shaped arcuately, and a nut having a maximum diameter substantially equal to the diameter of said body arranged in threaded engagement with the threaded portion of said shank and abutting said spring washer, said washer in its normal expanded state having an external diameter greater than the diameter of said body and having an internal diameter less than the diameter of said body.

CHESTER F. JOHNSON.

References Cited in the file of this patent

UNITED STATES PATENTS

| Number | Name | Date |
|---|---|---|
| 768,283 | Jenkins | Aug. 23, 1904 |
| 1,572,770 | Colley | Feb. 9, 1926 |
| 2,237,466 | Zimmerman | Apr. 8, 1941 |